United States Patent
Nguyen

Patent Number: 5,201,059
Date of Patent: Apr. 6, 1993

[54] METHOD FOR REDUCING POWER CONSUMPTION INCLUDES COMPARING VARIANCE IN NUMBER OF TIME MICROPROCESSOR TRIED TO REACT INPUT IN PREDEFINED PERIOD TO PREDEFINED VARIANCE

[75] Inventor: Au H. Nguyen, Santa Clara, Calif.

[73] Assignee: Chips and Technologies, Inc., San Jose, Calif.

[21] Appl. No.: 434,200

[22] Filed: Nov. 13, 1989

[51] Int. Cl.$^5$ .............. G06F 15/00; G06F 11/30
[52] U.S. Cl. .................. 395/800; 395/275; 395/750; 364/707; 364/DIG. 2; 364/264.4; 364/DIG. 1
[58] Field of Search ... 364/200 MS File, 900 MS File, 364/707, 264.4, 973.1; 371/12, 66, 70; 395/550, 275, 750, 800

[56] References Cited

U.S. PATENT DOCUMENTS

| | | | |
|---|---|---|---|
| 4,203,153 | 5/1980 | Boyd | 364/200 |
| 4,365,290 | 12/1982 | Nelms et al. | 364/200 |
| 4,615,005 | 9/1986 | Maejima et al. | 364/200 |
| 4,649,373 | 3/1987 | Bland et al. | 364/707 |
| 4,698,748 | 10/1987 | Juzswik et al. | 364/200 |
| 4,823,292 | 4/1989 | Hillion | 364/707 |
| 4,851,987 | 7/1989 | Day | 364/200 |
| 4,907,150 | 3/1990 | Arroyo et al. | 371/14 |
| 4,956,807 | 9/1990 | Hosaka et al. | 371/62 |
| 4,980,836 | 12/1990 | Carter et al. | 364/483 |
| 5,083,266 | 1/1992 | Watanabe | 395/275 |

*Primary Examiner*—Thomas C. Lee
*Assistant Examiner*—Mehmet Geckil
*Attorney, Agent, or Firm*—Townsend and Townsend

[57] ABSTRACT

Two methods and apparatus for reducing power consumption in battery powered computers are disclosed. The first places the computer in a sleep mode whenever a certain data input function is called. The second applies statistical analysis to calls to another data input function. By measuring the number of times the computer has tried to read data from the keyboard over the past predefined period, the variance between the high and low number of calls over the present and preceding time periods, and whether the number of times the computer has tried to read data has both exceeded the present limit and remained within the preset variance limit for a predefined minimum time, the desirability of activating a sleep mode for the computer can be determined.

1 Claim, 4 Drawing Sheets

METHOD FOR REDUCING POWER CONSUMPTION INCLUDES COMPARING VARIANCE IN NUMBER OF TIME MICROPROCESSOR TRIED TO REACT INPUT IN PREDEFINED PERIOD TO PREDEFINED VARIANCE

BACKGROUND OF THE INVENTION

This invention is in the field of digital computers. Specifically, it is a method and apparatus for placing the computer in an 'idle' or 'sleep' power saving mode while the computer waits for input.

In any computer, the speed of the computer's internal clock determines the rate of data processing. If all other factors are constant, a faster clock rate will result in faster processing. The penalty for faster processing is, unfortunately, increased power consumption. Every clock pulse causes at least some of the transistors in the central processing unit ('CPU') to change state. This change of state consumes power. Thus, the faster the clock rate, the more often transistors change state and the more power is consumed.

Although increased power consumption is not a major problem when a conventional A.C. power supply is available, it is a problem when batteries are used as the power source. To increase the useful operating time of computers powered by batteries, any means for reducing power consumption without impairing the operation of the computer is desirable.

One particular area where power savings may be realized is during the times when the computer is waiting for input from a keyboard or from an interface port. During these periods, the CPU continues to function in its standard mode, despite there being no work to do. Consequently, despite the fact that nothing is accomplished, power requirements are unchanged. A device or method which would reduce the power consumption of the CPU during these periods of waiting for data input is clearly desirable.

SUMMARY OF THE INVENTION

The present invention reduces CPU power consumption during periods when the CPU is waiting for keyboard or other data entry. Two different methods and apparatus for power consumption reduction are disclosed. These are Simple Sleep and Smart Sleep.

This invention operates in the specific environment of IBM PC AT compatible computers using Chips and Technology, Inc.'s LeAPset chipset.

In computers which fulfill the preceding requirements, two different procedures are used to allocate machine control while the computer waits for data input. In the first of these, control is turned over to the Basic Input/Output software ('BIOS') which in IBM PC ATs and compatibles is a software interface or "layer" which isolates operating systems from specific hardware devices. In the second, control remains with the application program, but calls are made to BIOS.

Simple Sleep operates when the first procedure is used. As its name implies, as soon as control is given to BIOS, the CPU is put into a sleep mode. This sleep mode can comprise either stopping the CPU, if the CPU is an 80286, or slowing the CPU's clock rate to 4 MHz, if the CPU is an 80386SX. With Simple Sleep, control remains with BIOS and the CPU sleeps until some input is received.

Smart Sleep is used when the second procedure is used. A statistical sampling analysis is made of the calls to BIOS. When the calls to BIOS are frequent enough, when their frequency remains relatively constant (limited variance) and when both the frequency and limited variance persist for a sufficient length of time, the computer is placed in a sleep mode.

BRIEF DESCRIPTION OF THE DRAWINGS

The present invention will now be explained in conjunction with the following figures in which.

BRIEF DESCRIPTION OF THE APPENDICES

Appendix A contains the computer software which operates the Simple Sleep aspect of the present invention. It is written in the 80286 assembly language.

Appendix B contains the computer software which operates the Smart Sleep aspect of the present invention. It is written in the 80286 assembly language.

Appendix C contains a description of the LeAPset chipset which implements the control logic in computers which can incorporate this invention.

DETAILED DESCRIPTION OF THE PREFERRED EMBODIMENT

The present invention operates in an environment which supports IBM's BIOS. A description of BIOS may be obtained in the "IBM Personal System/2 and Personal Computer BIOS Interface Technical Reference," 2nd Ed., May 1988, which is incorporated herein by reference.

Figure 1A:
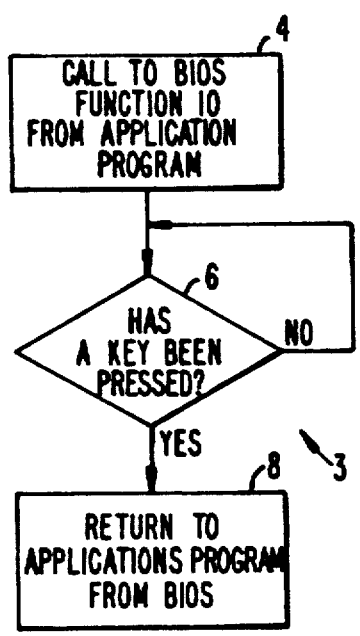
FIG. 1A is a flow chart of the procedure which invokes Simple Sleep.

Simple Sleep is activated by calls to BIOS functions INT 16H FUNC 0 or 10H, herein referenced as Function 3. A model flowchart for this function is shown in FIG. 1A. Application program 10 calls Function 3 at step 4, which turns control of the computer over to BIOS. Function 3 normally continues to ask step 6's question "Has a key been pressed?" until the answer is 'Yes'. When the key is pressed and the function can return a 'Yes', control returns to the application program at step 8.

The implementation of a sleep mode using Function 3 is relatively simple. As soon as BIOS receives control and no input from the keyboard is available, the computer is placed in the sleep mode. It awakens when a key is detected and control returns to the application program. The function which wakes the computer is implemented in the LeAP chipset. The software which effectuates Simple Sleep is listed in Appendix A. Referring to that appendix, whenever BIOS has control and no input is available, Simple Sleep is called. If the test at line 21 determines that Simple Sleep is enabled, the CPU is put to sleep. If Simple Sleep is not enabled, control immediately returns to the calling program.

Figure 1B:
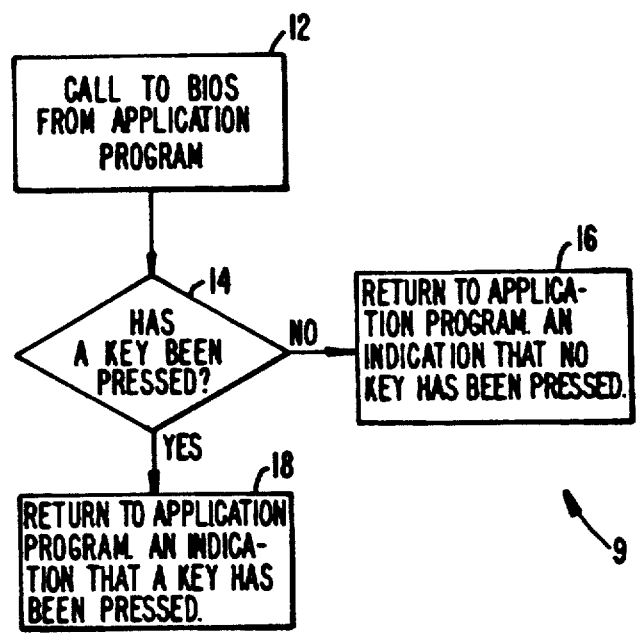
FIG. 1B is a flow chart of the procedure which invokes Smart Sleep.

Although Function 3 achieves the desired power reduction, it is not universally applicable. During many similar situations when the computer is waiting for input, useful work can be performed by the CPU prior to the receipt of the input. In these situations, simply putting the computer to sleep would not be the best course. As shown by FIG. 1B, when automatic sleep is undesirable, BIOS is called by Functions INT 16H FUNC 1 or 11H, herein referenced as Function 9. A call to Function 9 at step 12 does not turn control over to BIOS. Instead, Function 9 merely returns a Yes/No value (steps 14, 16, 18) every time it is called, depending upon whether a key is pressed or not. The application program will loop and continue calling Function 9 until a 'Yes' is received.

The Smart Sleep mechanism allows the computer to be placed in a sleep state in those situations where either no useful work can be accomplished between calls to BIOS or where whatever useful work could be performed has already been completed and the program is still waiting for input. Smart Sleep determines true idleness based on the frequency of calls to Function 9, the variance between the maximum number of calls to the function in a given time interval and the minimum, and the duration of a given frequency of calls over time.

It should be understood that different applications have different patterns of inactivity. The user sets the sensitivity of the Smart Sleep mechanism so that varying amounts of idleness can trigger the sleep mode, depending on the particular application. In essence, Smart Sleep uses a statistical process to determine when sleep can be commanded.

A running count of calls to Function 9 is kept for each clock tick interrupt interval. This count is compared to a preset number. If it is equal to or greater than the preset number, a tentative conclusion is drawn that sleep may be in order. The reason for a certain minimum number of calls being needed before sleep is commanded is that the calling program may be able to use the time between calls to Function 9 to do useful processing. If there was no minimum, occasional calls to the function might result in sleep, preventing the computer from performing useful work.

Next, the difference between the maximum number of calls to Function 9 and the minimum number of calls to the function during this and previous clock tick interrupt periods is calculated. This difference, herein called variance, is compared to a predefined maximum variance. If the variance is less than the maximum predefined variance, it means that the rate of calls to Function 9 have been fairly constant, another indication of possible idleness. Although some variance between the high and low number of calls is acceptable, too great a variance would indicate that some non-standard pattern has developed, a situation where the sleep mode would be inappropriate.

Finally, the conditions noted previously, the minimum number of calls exceeding the threshold and the variance between the high and low number of calls being in a certain range, must persist for a present amount of time. Requiring that the two previous described conditions persist for a certain amount of time insures that when the 'sleep' mode is commanded, it is appropriate.

Figure 3A:
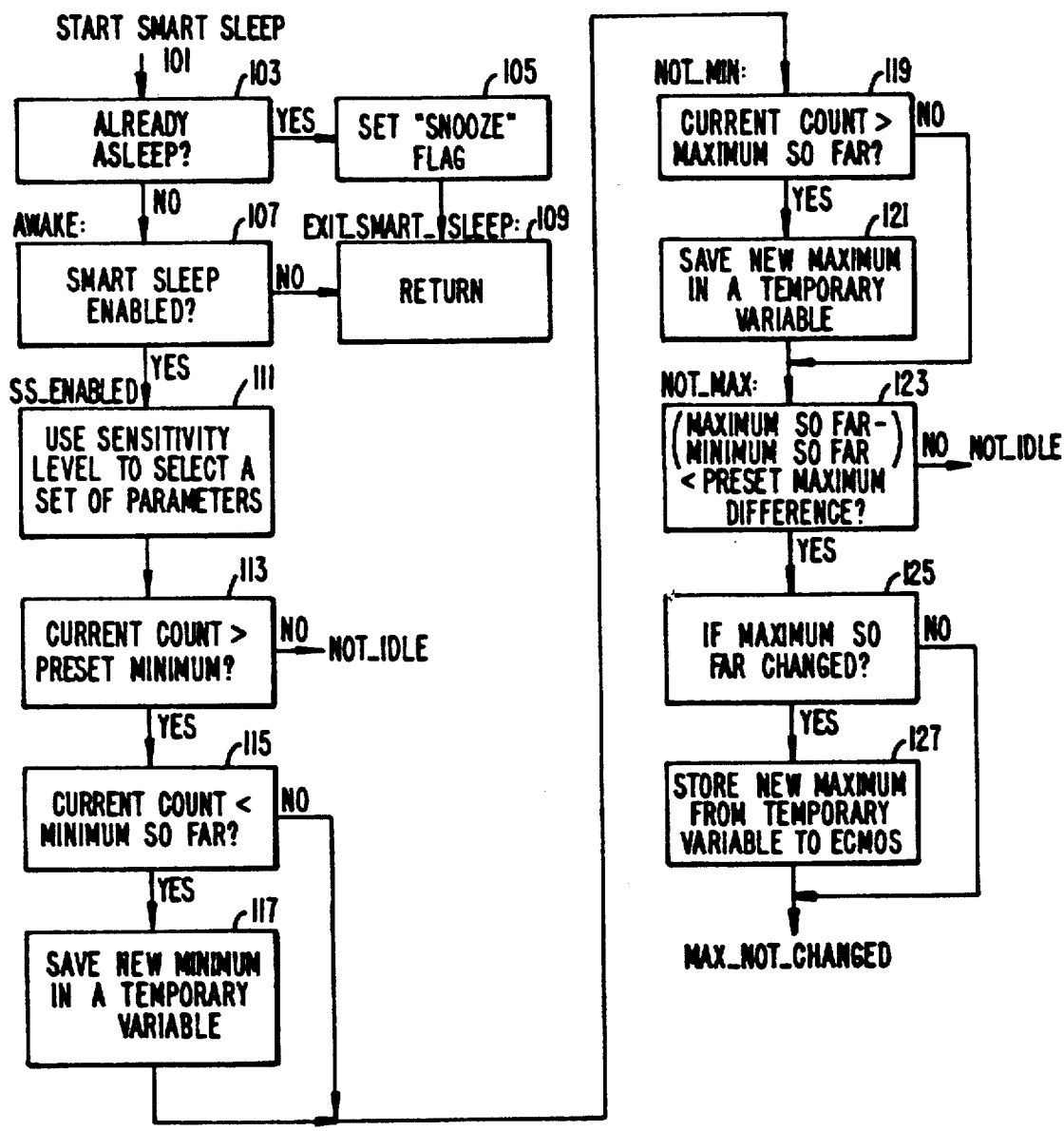
FIGS. 3A and 3B are a flow chart of the Smart Sleep mechanism.
Figure 3B:
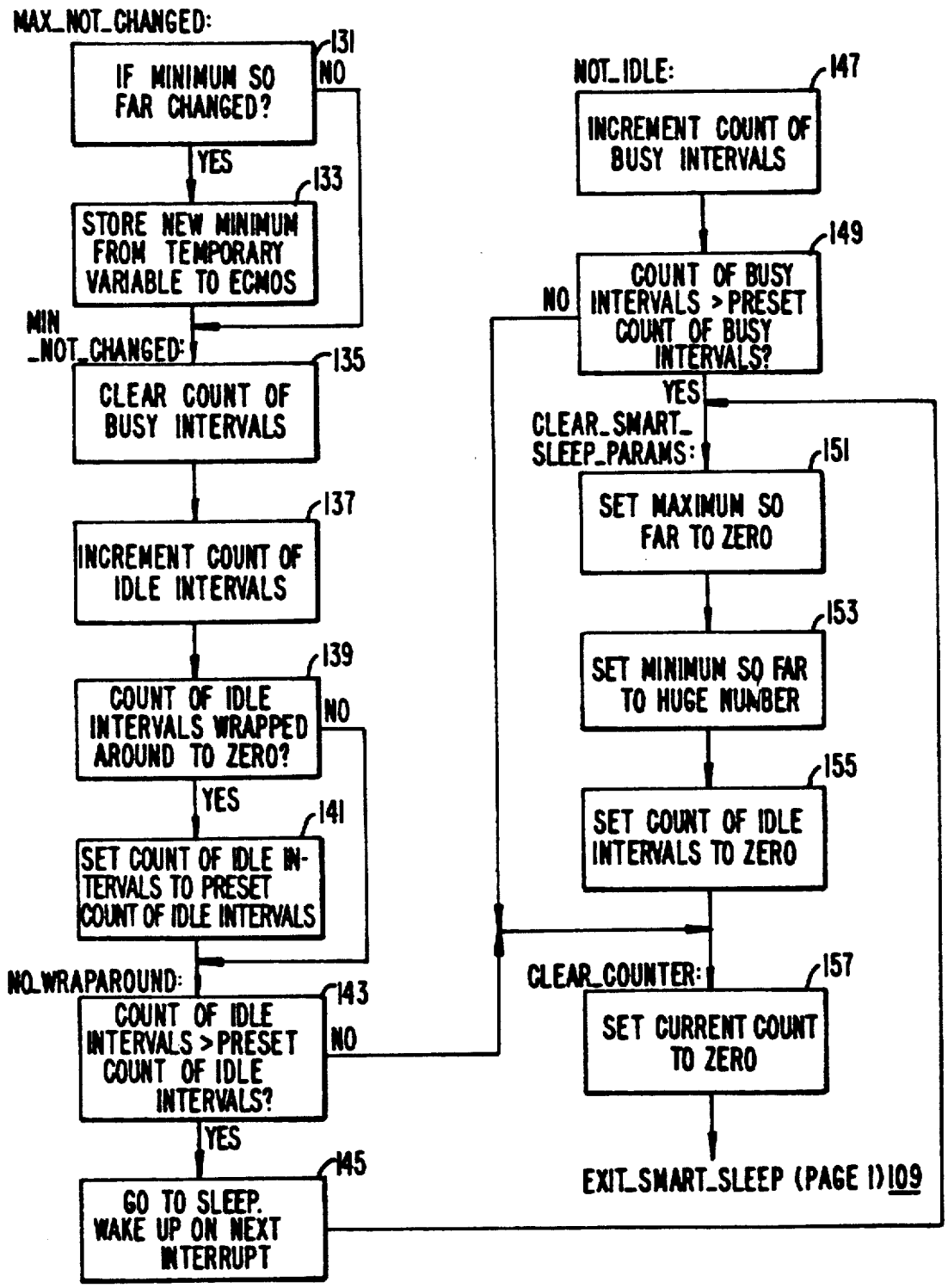

Smart Sleep will now be described with reference to both FIGS. 3A and 3B and Appendix B. The figures are referenced by the use of step numbers and the appendix is referenced by using line numbers.

Prior to actually calling Smart Sleep, various variables used therein must be properly initialized. This initialization occurs at lines 17-27 in Appendix B. The maximum count is set to zero, the minimum count is set to an impossibly large number, the variable which counts the number of calls to Function 9 is set to zero, the idle period counter is set to zero, and finally, the busy period counter is set to zero.

Figure 2:
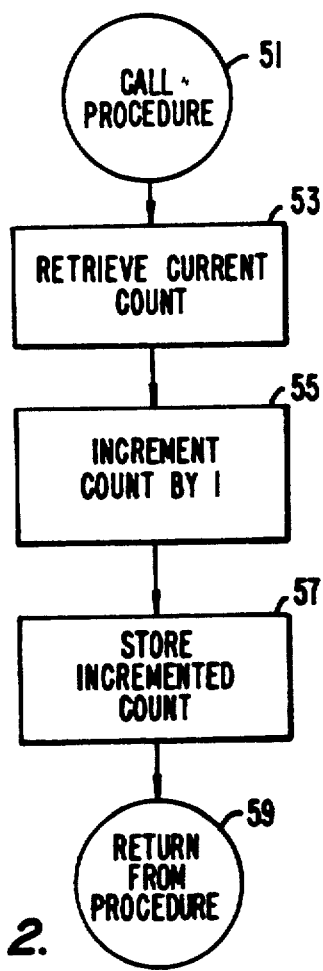
FIG. 2 is a flow chart of the counter function used by the Smart Sleep mechanism.

In the specific operating environment of the present invention, a clock tick interrupt is generated by the computer's hardware every 55 milliseconds. This is a standard feature of IBM PC ATs and compatibles. Every call to Function 9 during the interval between clock tick interrupts increments a counter variable. The procedure which increments the count is listed in Appendix B, lines 36-54 and shown in FIG. 2. The procedure comprises the steps of calling the procedure at step 51, retrieving the current count at step 53, incrementing the count by 1 at step 55, storing the incremented count at step 57 and returning to the calling program at step 59.

Every clock tick interrupt results in a call to Smart Sleep. Upon entry into the Smart Sleep mechanism at step 101 (lines 62-66), a test is made at step 103 to see if the CPU is already asleep (lines 73-76). If the CPU is sleeping, a "snooze" flag is set at step 105 (lines 77-79) and control returns to the calling program at step 109 (lines 214-219). If the CPU is not sleeping, the Smart Sleep Enable flag is tested at step 107. If the flag indicates that Smart Sleep is not enabled, control once again returns to the calling program at step 109.

If Smart Sleep is enabled, the sensitivity parameters to be used with it are recalled from memory at step 111 (lines 92-101). These parameters are recalled every time Smart Sleep is called. The first basic comparison test is performed at step 113. If the number of times Function 9 has been called does not exceed the preset minimum, it is assumed that the computer is not idle and control jumps to step 147 (lines 107-111). If the count does exceed the minimum, it is compared at step 115 to a variable which keeps track of the minimum number of times Function 9 has been called during any clock tick interrupt period (lines 117-120). If the current count is less than this minimum number it is stored in a temporary variable at step 117 (line 121). Whether or not the count is less than the minimum, it is also compared at step 119 (lines 122-128) to a similar variable which keeps track of the maximum number of times Function 9 has been called in any clock tick period. If the count exceeds the maximum to date, the count is stored at step 121 (line 129) as a temporary variable.

The next major test for the appropriateness of Smart Sleep occurs at step 123. The difference between the maximum count to this point in time and the minimum count is calculated. This difference, referenced herein as the variance, is compared to a preset maximum difference (lines 130-140). If the variance is greater than the preset maximum, control jumps to step 147. If it is less than this preset maximum, control moves to step 125.

Step 125 tests to see if the maximum count has changed (lines 144-146). If it has, the new maximum value is transferred from the temporary variable to permanent storage at step 127 (lines 147-149). If the maximum has not changed, a test is made at step 131 (lines 150-154) to see if the minimum count has changed. If it has, the new minimum count is moved from the temporary storage variable to permanent storage at step 133 (lines 155-157). If it has not, control skips to step 135.

At this point, there is a likelihood that the computer is at least idle at the present time. Therefore, the count of 'busy' time intervals is cleared at step 135 (lines 162-163) and the count of the number of idle intervals is incremented at step 137 (lines 170-172). The count of idle periods is checked to see if it has overflowed and been reset to zero at step 139. If it has overflowed, it is not desireable to begin counting idle periods from zero again as the sleep mode will not be triggered soon enough in that event. This contingency is accommodated by setting the count of idle periods to a preset number at step 141. (lines 174-177). If no overflow has occurred, control moves to step 143.

The final test to determine if sleep is appropriate occurs at step 143. The count of idle intervals is compared to a preset number of idle intervals (lines 178-179). If the idle intervals count does not exceed the preset interval count, program control goes to step 157, where the count of the number of times Function 9 has been called is reset to zero (lines 210-213) and control returns to the calling program at step 109. If the count did exceed the preset number, the CPU goes to sleep at step 145 (lines 186-188). At the next interrupt the CPU wakes up and control goes to step 151.

As indicated earlier, when either the first or second test for idleness fails, control goes to step 147. At step 147, the busy interval count is incremented (lines 195-200). If this count exceeds a preset number of busy intervals when this test is performed at step 149 (lines 201-202), program control flows to step 151. If not, control flows to step 157, the operation of which has already been described.

Step 151 is performed when either the count of busy intervals exceeds the preset maximum number of busy intervals or when the CPU wakes up upon receipt of an interrupt after being asleep. The maximum number of calls to Function 9 is reset to zero at step 151, the minimum is set to an impossibly large number at step 153, and the count of idle intervals is reset to zero at step 155 (lines 207-209). After step 155, control once again flows to step 157, which has been described previously. This completes the description of the Smart Sleep mechanism.

Figure 4:
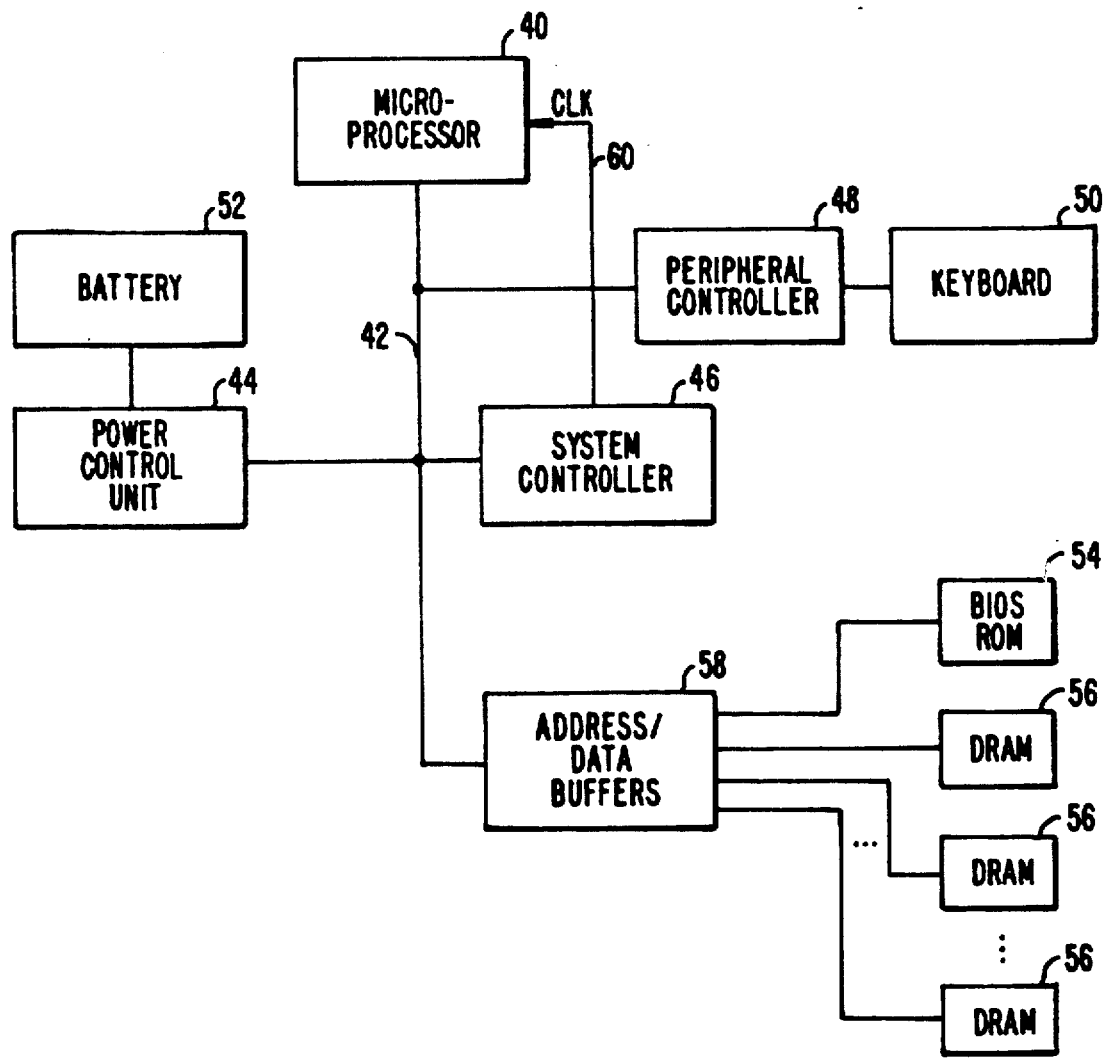
FIG. 4 is a block diagram of a computer system implementing the present invention.

FIG. 4 is a block diagram of a system implementing the present invention as described in more detail in Appendix C. A microprocessor 40 is connected, through a bus 42, to a power control unit 44, a system controller 46, and peripheral controller 48. Peripheral controller 48 receives inputs from keyboard 50. Power control unit 44 receives power from a battery 52. A BIOS ROM 54 and DRAM memory 56 are connected to an address/data buffer 58. System controller 46, in a preferred embodiment, is system controller 82C241 described in Appendix C which provides clock signal 60 to microprocessor 40. Power control unit 44 corresponds to unit 82C636 of Appendix C. Peripheral controller 48 corresponds to unit 82C206 of Appendix C.

Both Simple Sleep and Smart Sleep have been described in a particular embodiment in a particular environment. The LeAPset chipset, which forms the control logic, has a particular hardware configuration which enables it both to slow or stop the CPU's clock and to wake the CPU up. This hardware support is necessary for the proper functioning of this invention, but it is readily foreseeable that the hardware functions needed to support this invention will be implemented in other chipsets and other computers. Implementation of both these mechanisms in other computers would entail significant modification to the software contained in appendices A and B. However, such implementation on other battery powered computers or devices which use a CPU would provide equal benefits. Consequently, such modifications and alterations to enable the present device to operate in such environments is considered to be within the scope of this invention. The description and claims should therefore be read in a broad rather than a restrictive sense.

```
1   ;***********************************************************
2   ; This is the "dumb" sleep mode function. It is called whenever the
3   ; BIOS has control AND the application wants to wait for an interrupt
4   ; driven event, e.g.  INT 16H, func 00 or 10H, wait for a key.
5   ;
6   ; We go to sleep by setting the sleep bits in the LeAP chipset's sleep
7   ; mode control register, and executing a HALT. Any interrupt will wake
8   ; this baby up, at which time, we'll service the interrupt as usual and
9   ; then return to the caller.
10  ;***********************************************************
11  ;
12  Sleep   PROC    NEAR
13
14          PUSH    AX
15.         PUSH    DX
16          PUSHF                                       ;Save original interrupt flag
17          CLI                                         ;Take the fone off the hook
18          MOV     DX,Chips_Index                      ;LeAP chipset index register
19          MOV     AL,LEAP_Sleep_Reg                   ;Index to sleep mode register
20          CALL    Chip_Read                           ;Read sleep register
21          TEST    AH,Sleep_Enable                     ;Is master sleep enable set?
22          JZ      Exit_Sleep                          ; no, don't sleep
23          OR      AH,Sleep_Enable + Sleep_Bit         ;Set sleep bits
24          CALL    Chip_Write                          ;Write it back out
25          STI                                         ;Put the fone back on the hook
26          HLT                                         ;Now go to sleep
```

```
27  Exit_Sleep:
28          POPF                                    ;Restore original int flag
29          POP     DX
30          POP     AX
31          RET                                     ;Go back to caller when awaken
32
33  Sleep   ENDP
34
```

```
1   ;*********************************************************************
2   ; This procedure will initialize things used by the LeAP BIOS, including the
3   ; ECMOS data area used by "smart" sleep mode.
4   ;*********************************************************************
5
6   Init_LeAP       PROC    NEAR
7
8           PUSHF                                           ;Save interrupt flag
9           CLI                                             ;No 'rupts til put is done
10          MOV     AH,ECMOS_LeAP_Flags                     ;Get LeAP flags byte
11          CALL    Get_CMOS                                ; out of ECMOS
12          AND     AL,SmartSleep_Enable + SusRes_Enable    ;Clr all but
13          DEC     AH                                      ; these bits
14          CALL    Put_CMOS                                ; and write it back out
15          POPF                                            ;Restore interrupt flag
16
17          XOR     BX,BX                                   ;Clear
18          CALL    Put_CMOS_BX                             ; current_count
19          CALL    Put_CMOS_BX                             ; max_so_far
20          MOV     BX,0FFFFH                               ;Set to humongous value
21          CALL    Put_CMOS_BX                             ; min_so_far
22          MOV     AX,ECMOS_How_Long_Idle * 100H           ;Clear counter of how many
23          CALL    Put_CMOS                                ; idle periods have we had
24          CALL    Put_CMOS                                ; ditto busy periods
25          RET
26
27  Init_LeAP       ENDP
28
29  ;*********************************************************************
30  ; This procedure is called everytime the BIOS keyboard status function
31  ; is called. That's both regular and unleaded, er, I mean, regular and
32  ; extended. It will increment the "keyboard status call" counter used
33  ; by "smart" sleep mode. It must preserve ZF and AX.
34  ;*********************************************************************
35
36  Inc_Sleep_Ctr   PROC    NEAR
37
38          PUSHF
39          PUSH    AX
40          PUSH    BX
41
42          CLI                                     ;No 'rupts til put is done
43          MOV     AH,ECMOS_Current_Count          ;Get current count value
44          CALL    Get_CMOS_BX                     ; (16 bit) into BX
45          INC     BX                              ;One more stat call ...
46          SUB     AH,2                            ;Point back to lo byte of ctr
47          CALL    Put_CMOS_BX                     ;Write back to ECMOS
48
49          POP     BX
```

```
50              POP     AX
51              POPF
52              RET
53
54      Inc_Sleep_Ctr   ENDP
55
56      ;*************************************************************
57      ; This is the "smart" sleep mode function.  It is called every clock
58      ; tick interrupt.  It basically tries to guess when the application is
59      ; idle and activates sleep mode.
60      ;*************************************************************
61
62      Smart_Sleep     PROC    NEAR
63
64              PUSHF
65              CLI
66              PUSHA
67
68      ; If we're already sleeping, that means a previous timer_interrupt detected
69      ; an idle condition and put the machine to sleep, and we've been woken up
70      ; by another timer_interrupt.  Just set a flag to tell previous instance of
71      ; smart_sleep to go back to sleep.
72
73              MOV     AH,ECMOS_LeAP_Flags     ;Get LeAP flags byte
74              CALL    Get_CMOS                ; out of ECMOS
75              TEST    AL,Sleeping             ;See if already sleeping
76              JZ      Awake                   ;No, go check counter etc
77              MOV     AX,42C7H                ;Call int15 func 42 subfunc c7
78              INT     15H                     ; to set go_back_to_sleep bit
79              JMP     Exit_Smart_Sleep        ;Get out
80      Awake:
81
82      ; If smart_sleep is disabled, exit this routine.
83
84              TEST    AL,SmartSleep_Enable    ;See if smart sleep is enabled
85              JNZ     SS_Enabled              ; go on if it is
86              JMP     Exit_Smart_Sleep        ; get out if not
87      SS_Enabled:
88
89      ; Get the current smart_sleep sensitivity level out of ECMOS and use it to
90      ; index into a table of smart_sleep parameters.
91
92              MOV     AH,ECMOS_SS_Sensitivity ;Get sensitivity level
93              CALL    Get_CMOS                ; out of ECMOS and into AL
94              CMP     AL,Max_SS_Sensitivity   ;Is it out of range?
95              JBE     Got_Sensitivity         ; no, go on
96              MOV     AL,Max_SS_Sensitivity   ; yes, set it to maximum
97      Got_Sensitivity:
98              MOV     BL,SS_Param_Size        ;Get size of each entry in tbl
99              MUL     BL                      ;Multiply: ax = al * bl
100             ADD     AX,OFFSET SS_Param_Table ;Calculate ptr to params
101             MOV     BP,AX                   ; and put it in base reg
102
103     ; Is the count of calls to INT 16 functions 1 and 11 since the last clock
104     ; tick interrupt at least min_stat?  If yes, that probably means the application
105     ; has nothing better to do and has been polling for keys pretty frequently.
106
107             MOV     AH,ECMOS_Current_Count  ;Get current_count
108             CALL    Get_CMOS_BX             ; out of ECMOS
109             MOV     CX,BX                   ;Save for later
```

```
110         CMP     CX,CS: Min_Stat [BP]            ;Current_count < min_stats ?
111         JB      Not_Idle                        ;Yes, we're not idle
112
113 ; Compare the current count against high and low water marks (max_so_far
114 ; and min_so_far, respectively), and save new min and max values, but
115 ; don't write them to ECMOS yet, in case this is an ignore-able aberration.
116
117         MOV     AH,ECMOS_Min_So_Far             ;Get min stat count so far
118         CALL    Get_CMOS_BX                     ; from ECMOS into BX
119         CMP     CX,BX                           ;Current_count < min_so_far ?
120         JAE     Not_Min                         ;No, above or equal, not a min
121         MOV     BX,CX                           ;Save new min
122 Not_Min:
123         MOV     DI,BX                           ;Save min in DI for later use
124
125         MOV     AH,ECMOS_Max_So_Far             ;Get max stat count so far
126         CALL    Get_CMOS_BX                     ; from ECMOS into BX
127         CMP     BX,CX                           ;Max_so_far < current_count ?
128         JAE     Not_Max                         ;No, above or equal, not a max
129         MOV     BX,CX                           ;Save new max
130 Not_Max:
131         MOV     DX,BX                           ;Save max in DX for later use
132
133 ; Is the difference between high and low marks less than max_diff? If yes,
134 ; that means the application has been polling for keys at a fairly steady
135 ; rate, another possible indication of idleness.
136
137         MOV     SI,DX                           ;Max_so_far
138         SUB     SI,DI                           ;Max_so_far - min_so_far
139         CMP     SI,CS: Max_Diff [BP]            ;Our diff < max_diff ?
140         JAE     Not_Idle                        ;No, above or equal
141
142 ; Save new max_so_far and min_so_far to ECMOS if either (or both) has changed.
143
144         MOV     AH,ECMOS_Max_So_Far             ;Point to hi water mark
145         CMP     CX,DX                           ;Current_count = max_so_far?
146         JNE     Max_Not_Changed                 ;No, max hasn't changed
147         MOV     BX,DX                           ;Write new max
148         CALL    Put_CMOS_BX                     ; to ECMOS
149         JMP     SHORT Done_Max
150 Max_Not_Changed:
151         ADD     AH,2                            ;Point to lo water mark
152 Done_Max:
153         CMP     CX,DI                           ;Current_count = min_so_far?
154         JNE     Min_Not_Changed                 ;No, min hasn't changed
155         MOV     BX,DI                           ;Write new min
156         CALL    Put_CMOS_BX                     ; to ECMOS
157 Min_Not_Changed:
158
159 ; We're idle during the last clock tick period, so let's clear the count of
160 ; how many consecutive busy periods have we had.
161
162         MOV     AX,ECMOS_How_Long_Busy * 100H   ;Clear count of busy periods
163         CALL    Put_CMOS                        ; in ECMOS
164
165 ; How long has this frequent and regular polling for keys been going on?
166 ; If it has been going for at least num_ticks, then it's my guess that the
167 ; application is idle. If not, we'll just clear the counter and count
168 ; keyboard stat calls again until the next clock tick interrupt.
169
```

```
170         MOV     AH,ECMOS_How_Long_Idle      ;Get count of idle periods
171         CALL    Get_CMOS                    ; out of ecmos
172         INC     AL                          ; and increment it
173         JNZ     No_Wraparound               ;Did it wrap around to zero ?
174         MOV     AL,CS: Num_Ticks [BP]       ;Yes, set it to num_ticks
175 No_Wraparound:
176         DEC     AH                          ;Point back to how_long_idle
177         CALL    Put_CMOS                    ;Write new value back out
178         CMP     AL,CS: Num_Ticks [BP]       ;How_long_idle >= num_ticks
179         JB      Clear_Counter               ;No, go prepare for next period
180
181 ; At this point, we've decided that the system is idle. We'll go to sleep
182 ; until the next interrupt, any interrupt. If it's a clock tick interrupt,
183 ; or any others that set the go_back_to_sleep bit, we'll just go right back
184 ; to sleep, otherwise we'll go brush our teeth and start the day.
185
186         MOV     AX,42C5H                    ;Call int15 func 42 subfunc c5
187         INT     15H                         ; to sleep til next interrupt
188         JMP     SHORT Clear_Smart_Sleep_Params ;And start over
189
190 ; We have not been idle since the last timer tick. If we have only been busy
191 ; for less than busy_threshold consecutive timer ticks, then this may be an
192 ; anomaly due to servicing asynchronous interrupts, etc. In that case, cut
193 ; it some slack and do not start over in looking for idleness.
194
195 Not_Idle:
196         MOV     AH,ECMOS_How_Long_Busy      ;Get count of busy periods
197         CALL    Get_CMOS                    ; from ECMOS
198         INC     AL                          ; up it by one
199         DEC     AH                          ; point back to how_long_busy
200         CALL    Put_CMOS                    ; and save new value
201         CMP     AL,CS: Busy_Threshold [BP]  ;Have we been busy long enough
202         JBE     Clear_Counter               ;No, ignore this (?) anomaly
203
204 ; We have been not idle for long enough, reset high and low water marks, etc
205 ; and start over in looking for idleness.
206
207 Clear_Smart_Sleep_Params:
208         MOV     AX,42C9H                    ;Call int15 func 42 subfunc c9
209         INT     15H                         ; to reset smart_sleep
210 Clear_Counter:
211         XOR     BX,BX                       ;Clear
212         MOV     AH,ECMOS_Current_Count      ; counter of how many
213         CALL    Put_CMOS_BX                 ; stat calls in current period
214 Exit_Smart_Sleep:
215         POPA
216         POPF
217         RET
218
219 Smart_Sleep     ENDP
220
221 ;************************************************************************
222 ; This table of smart sleep paramters is indexed into using the sensitivity
223 ; level, which can be set from the popup menu.
224 ;
225 ; The elements are as follows:
226 ;
227 ;       min_stat        how many stat calls must they make in one clock tick
228 ;                       before we'll think they're idle; depends on CPU speed,
229 ;                       application, etc.
```

```
230 ;
231 ;       max_diff         how much variance in the number of stat calls from one
232 ;                        clock tick to the next are we going to allow before we
233 ;                        no longer think the application is idle.
234 ;
235 ;       num_ticks        how long must the last two conditions be met before
236 ;                        we go to sleep.
237 ;
238 ;       busy_threshold   and if they cease to meet the first two criteria part
239 ;                        way thru num_ticks, how long must they not meet spec
240 ;                        before we start over.
241 ;************************************************************************
242
243 SS_Param_Table  LABEL     BYTE
244
245         SS_Param         128,    1,      180,    1       ;0  w 10 sec
246         SS_Param         128,    1,      162,    1       ;1  w  9 sec
247         SS_Param         128,    1,      144,    1       ;2  w  8 sec
248         SS_Param         128,    1,      126,    1       ;3  w  7 sec
249         SS_Param         128,    1,      108,    1       ;4  w  6 sec
250         SS_Param         128,    2,      90,     1       ;5  w  5 sec
251         SS_Param         128,    2,      72,     1       ;6  w  4 sec
252         SS_Param         128,    3,      54,     1       ;7  w  3 sec
253         SS_Param         128,    3,      36,     2       ;8  w  2 sec
254         SS_Param         128,    4,      18,     2       ;9  w  1 sec
255         SS_Param         128,    4,      9,      2       ;10 w .5 sec
256
257 Max_SS_Sensitivity       EQU     (($ - SS_Param_Table) / SS_Param_Size) - 1
258
259 ;************************************************************************
260
```

PRODUCT SPECIFICATIONS FOR LeAPset CS8223 (LeAPset-sx CS8283)

Low-Powered Enhanced AT Portable
LeAPset CS8223 (LeAPset-sx CS8283)

100% IBM PC/AT Compatible AT CHIPSet for 12, 16 and 20 MHz *Laptop* Systems

100% compatible to CHIPS' NEAT CHIPSet (CS8221)

Special power save features to accomodate laptop low power requirements:

Sleep mode
    Slow Refresh DRAM support
    Suspend/Resume Support
    Selectable operating frequencies
    Auto power off feature Supports 80286 and 80386sx microprocessors Complete System board requires only 17 logic components plus memory and processors Power Control Unit (PCU) to control system power sources Supports Single ROM for both System and Video BIOS Supports ROM cartridges Supports three programmable I/O decodes Supports password/security EEPROMs Two multipurpose programmable parallel I/O ports The LeAPset CS8223 (LeAPset-sx CS8283), are very highly integrated application specific integrated circuits which implement the control logic used in the IBM PC AT compatible computers with additional functions included for laptop use and efficiency. The CS8223 CHIPset supports a 80286 based system, while the CS8283 CHIPSet supports the 80386sx based system. The CS8223 CHIPSet consists of the following:

- 82C241 includes the CPU/BUS, the Page/Interleave and EMS memory controller in addtion to some laptop specific control features. Essentially it is a superset of the NEAT 82C211 and 82C212
- 82C242 includes the Data/Address buffers and the bus conversion logic
- 82C636, the Power Control Unit which controls the system power and provides slow refresh DRAM support in standby mode
- 82C206, the Integrated Peripherals Controller
- 82C609, the multifunction controller which provides one parallel port and two UART channel interfaces
- 82C425 (or 82C455) LCD (or advanced LCD) controller.

The difference between the CS8223 and CS8283 CHIPSets is one component. The 82C241 is used in an 80286 system and the 82C841 is used in an 80386sx based system. They are functionally identical, but differ in their CPU interfaces. LeAPset CS8223(LeAPset-sx CS8283) CHIPSets are 100% compatible with the NEAT CHIPSet. They are designed to be specifically used in laptops. However, they can be used to implement a small footprint desktop machine where integration is the critical factor. As these CHIPSets are completely compatible with the NEAT CHIPSet, only the additional features will be described here. For detailed NEAT features see the NEAT CHIPSet data book.

PRODUCT SPECIFICATIONS FOR LeAPset CS8223(LeAPset-sx CS8283)

82C241 (82C841) System Controller Specifications

Features:

● Includes 82C211 Bus controller features:

- Clock Generation with programmable speed selection
- Optional Independent AT bus clock
- CPU interface and bus control
- Programmable command delays and wait state generation
- Port B register and NMI logic
- CPU state machine, AT bus state machine and bus arbitration logic
- Action Code generation logic
- DMA and Refresh logic
- Numeric Coprocessor interface logic
- Configuration Registers ● Includes 82C212 Page/Interleave and EMS memory controller features:

- Page mode access including single bank, odd number of banks, 2 way and 4 way interleave, providing higher performance over conventional DRAM accessing schemes
- Supports 100ns and 80ns DRAMs at 16MHz and 20MHz respectively, using page mode operation
- Supports up to 4 banks of on board memory, up to 8M Bytes using 1Mx1 DRAMs

- Provides remapping of RAM resident in 640k to 1Mbyte area to the top of the 1Mbyte address space
- Supports LIM-EMS 4.0 with four EMS page registers on chip and up to 512 page registers via external EMS mapper chips, 82C631
- Shadow RAM features for efficient System and Video BIOS execution
- OS/2 Optimization features allow fast switching between protected and real mode
- Staggered refresh to reduce power supply noise
- Supports external EMS mapper interface ● Supports Sleep mode by shutting off the clock ● Supports up to 3 programmable decodes for I/O addresses ● Supports single BIOS EPROM option and combined Video BIOS ● Supports ROM cartridge option Refer to the CHIPS' CS8221 New Enhanced AT(NEAT) data book for detailed 82C211 and 82C212 functional specifications. Additional laptop oriented power-save features will be discussed in a later section.

What is claimed is:

1. A method for placing a microprocessor into a sleep state while the microprocessor waits for data input from a keyboard, the method being performed in a system controller coupled to said microprocessor and comprising the steps of:

counting a number of times the microprocessor has tried to read data from the keyboard in a predefined amount of time;

comparing said number of times the microprocessor tried to read data in the predefined amount of time with a predefined minimum number;

comparing the variance in said number of times the microprocessor tried to read data in a predefined amount of time to a predefined variance amount, if a number of tires exceeded said predefined minimum number;

comparing a length of time that both said number of times the microprocessor tried to read data exceeded said predefined minimum number and the result was less than the predefined variance to a predefined minimum time if the variance was less than the predefined variance;

placing the computer into a sleep state if the length of time exceeded the minimum time.

* * * * *